United States Patent [19]
Parmenter

[11] 3,821,501
[45] June 28, 1974

[54] BATTERY DISCONNECTOR
[76] Inventor: Robert W. Parmenter, 26 Burnett St., Auburn, Mass. 01501
[22] Filed: Jan. 12, 1973
[21] Appl. No.: 323,217

[52] U.S. Cl. ...... 200/155 R, 200/153 P, 307/10 AT
[51] Int. Cl. ............................................ H01h 19/20
[58] Field of Search ............ 200/155 R, 153 P, 162, 200/168 R; 307/10 AT

[56] References Cited
UNITED STATES PATENTS

| | | | |
|---|---|---|---|
| 1,103,525 | 7/1914 | McKenna | 307/10 AT X |
| 1,785,194 | 12/1930 | Hammerly | 200/162 |
| 1,793,033 | 2/1931 | Welling | 307/10 AT |
| 1,931,827 | 10/1933 | Newman | 200/153 P |
| 2,004,207 | 6/1935 | LaPlante | 307/10 AT X |
| 2,104,689 | 1/1938 | Barker et al. | 307/10 AT X |
| 2,156,882 | 5/1939 | Specht | 200/153 P X |
| 2,439,634 | 4/1948 | Robey | 307/10 AT |
| 2,519,167 | 8/1950 | Wilde | 307/10 AT X |
| 2,720,619 | 10/1955 | James | 200/153 W UX |
| 2,768,311 | 10/1956 | Durnin | 307/10 AT |
| 2,802,115 | 8/1957 | Datesman et al. | 307/10 AT |
| 2,853,627 | 9/1958 | Karl | 307/10 AT |

FOREIGN PATENTS OR APPLICATIONS

| | | | |
|---|---|---|---|
| 1,255,029 | 1/1961 | France | 200/153 P |
| 124.748 | 4/1949 | Sweden | 200/153 P |

*Primary Examiner*—Robert K. Schaefer
*Assistant Examiner*—William J. Smith
*Attorney, Agent, or Firm*—Charles R. Fay

[57] ABSTRACT

A battery disconnector particularly adapted for disconnecting the batteries of automobiles to prevent theft comprising a remote operated rotary switch having two fixed contacts, one to one of the cables of the battery, and the other preferably between the battery and the electric starting motor. A rotatable connector is adapted to carry the current between these contacts and is turned by a gear in turn operated by a pinion gear connected to a rotary shaft or the like which may be either locked by a key or have an operating handle hidden in an unexposed portion of the vehicle, e.g., under the dashboard.

1 Claim, 4 Drawing Figures

PATENTED JUN 28 1974     3,821,501
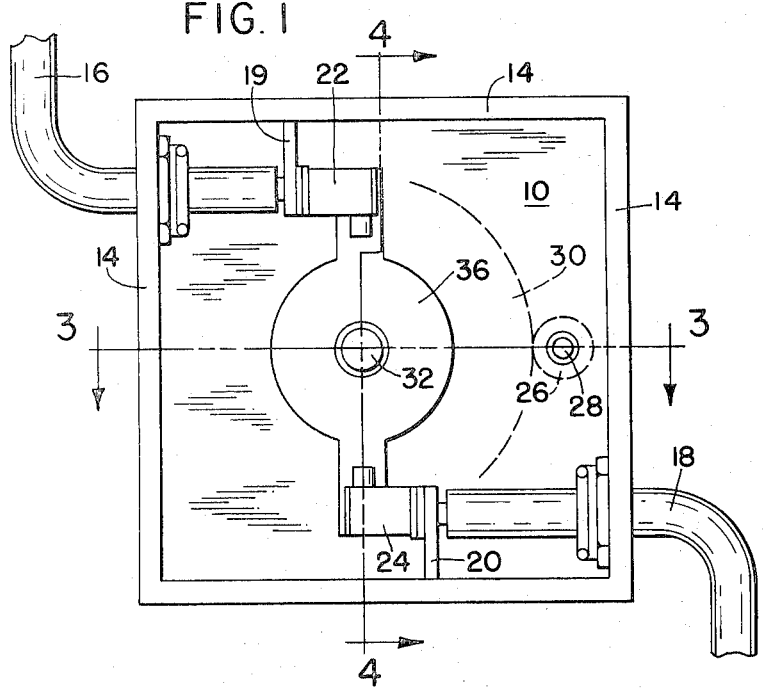
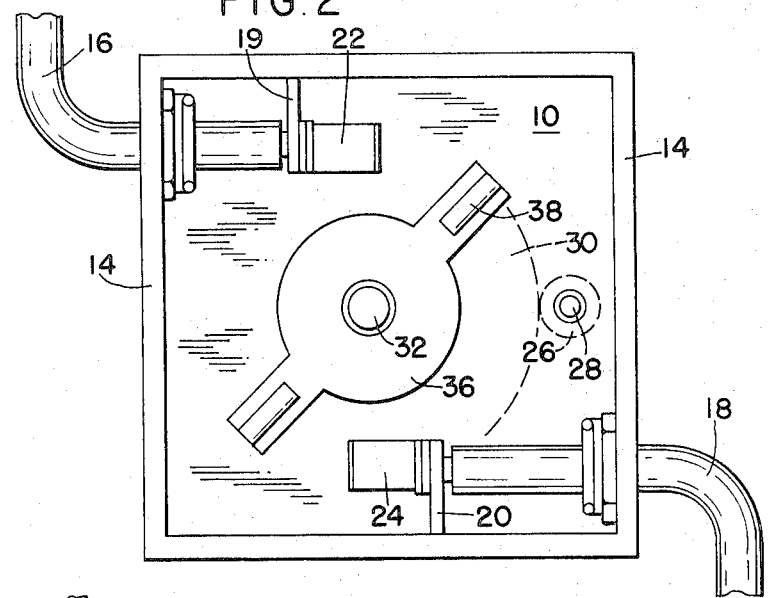
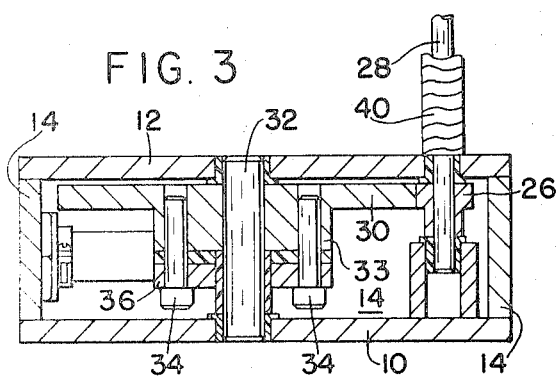
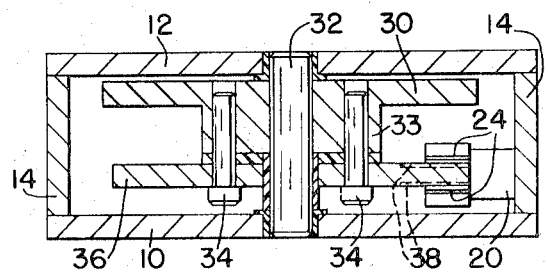

BATTERY DISCONNECTOR

BACKGROUND OF THE INVENTION

There have been many suggestions for preventing automobile theft including all kinds of visible and audible signals, starving of the gasoline, and disconnecting the battery. However, most of these devices are difficult to install and are expensive to manufacture and in many cases are not really effective, and it is the purpose of the present invention to provide a positively actuated simple and relatively inexpensive device for disconnecting the battery from the starter.

SUMMARY OF THE INVENTION

A concealing and protective housing is provided internally with a pair of fixed terminals preferably of the clip type, these being spaced and completely concealed in the housing. One connector is connected with the power source battery and the other to the electric starting motor and as long as they are spaced from each and not electrically connected the battery of course cannot operate.

A large and small pinion gear are provided, the smaller gear being driven for instance by a flexible shaft or the like from any distance or location, and this shaft may be provided with a key to lock or unlock it or it may be concealed.

The large gear is provided with a connecting bridge between the two contacts described. The small gear is rotated 360° and the larger gear and the connector rotate 45°, electrically connecting the two contacts described in the housing and allowing the current to flow to operate the vehicle.

The housing is preferably coated and sealed to prevent tampering.

BRIEF DESCRIPTION OF THE DRAWINGS

FIG. 1 is a plan view of the device with the cover of the housing removed illustrating the device in operative condition;

FIG. 2 is a similar view showing no electric flow possible;

FIG. 3 is a section on line 3—3 of FIG. 1; and

FIG. 4 is a section on line 4—4 of FIG. 1.

PREFERRED EMBODIMENT OF THE INVENTION

A strong steel box or housing is provided which is permanently closed by welding after installation of the disconnector. This box is located wherever desired or convenient and it includes a bottom 10, top 12, and side walls 14, 14. In two of the opposite side walls 14 there are means leading electric cables 16, 18 into the box and these are firmly secured therein as for instance by partitions or plates 19, 20. On the ends of the cables there are provided fixed contacts 22 and 24 which are preferably of a double leg spring clip type as shown in FIG. 4, and these are held in fixed position by any means desired but the legs of the clips are easily spread in order to receive a connecting bridge or contact to be described. These clips are conveniently mounted on the plates 19, 20, and are insulated therefrom.

Pinion gear 26 is adapted to be driven by a flexible shaft or the like connected to the pinion shaft 28, see FIG. 3. This pinion is in constant mesh with a larger gear 30 mounted on a stub-shaft or the like 32 insulated from the box as shown in FIGS. 3 and 4.

The gear 30 is provided with a hub 33 securely bolted by a plurality of bolts 34, 34, to an electricity conducting bridge or connector piece 36, the outline of which is best shown in FIGS. 1 and 2. This bridge or connector piece is provided with top and bottom radii 38, 38 providing a better contact with respect to the electric clips 22, 24 in the bridging or connecting position of FIG. 1. These radii are relatively small.

In the operation of the device the flexible shaft or the like which is indicated at 40 in FIG. 3 as having an armored protective cable 40, may be turned from any location not shown as under the dashboard, in a secret compartment, or other hidden location, and may be turned only from that point to both engage and disengage the bridge with respect to the electric clip connectors 22 and 24 as described.

In order to assemble the parts the bottom 10 may be connected by a plurality of buttonhead screws or the like but it is preferred that once the box is completely assembled it should be coated and sealed by any means desired to prevent tampering with it.

Preferably the flexible shaft is driven by a hand operated lockable device which is capable of rotating 360° to so rotate pinion 26 and to rotate gear 30 45°, between the positions shown in FIGS. 1 and 2.

I claim:

1. A battery disconnector comprising a permanently closed and welded housing including top, bottom, and side walls, a pair of electric contacts therein, means securing an electric cable to each said contact, said electric cables extending through certain walls of the housing, a rotary electric conducting connecting bridge having a position connecting the electric contacts and a position at an angle thereto disconnecting the contacts, a gear for rotating said bridge, and a pinion for said gear, an armored flexible shaft for operating said pinion, the flexible shaft being manually operable, the bridge and gears being completely concealed and unaccessible in the housing, said housing including a pair of opposite side walls, said cables entering said housing in opposite directions through said side walls, and said electric contacts being secured with respect to the ends of said cables at opposite sides of the housing, means rotatably mounting said electric connecting bridge adjacent the center of the housing between the top and the bottom thereof, opposed radially extending portions on the bridge to engage said electric contacts and to be disengaged therefrom depending upon the rotation of said gear, said contacts being of the spring clip type each including a pair of resilient arms for receiving between them the radially extending contacting ends of said bridge, and insulation between said bridge and both the housing and the gearing.

* * * * *